(12) United States Patent
Cabaret et al.

(10) Patent No.: US 7,817,565 B2
(45) Date of Patent: Oct. 19, 2010

(54) METHOD OF DATA INTEGRITY CONTROL IN AN AFDX NETWORK

(75) Inventors: Remi Cabaret, Toulouse (FR); Francoise David-Tupinier, Toulouse (FR); Remi Andreoletti, Tournefeuille (FR)

(73) Assignee: Airbus France, Toulouse (FR)

( * ) Notice: Subject to any disclaimer, the term of this patent is extended or adjusted under 35 U.S.C. 154(b) by 170 days.

(21) Appl. No.: 12/054,053

(22) Filed: Mar. 24, 2008

(65) Prior Publication Data

US 2008/0239973 A1    Oct. 2, 2008

(30) Foreign Application Priority Data

Mar. 26, 2007    (FR) .................................. 07 54022

(51) Int. Cl.
*H04L 12/26* (2006.01)
(52) U.S. Cl. ........................................ 370/244; 701/14
(58) Field of Classification Search ................. 370/242, 370/244, 245, 247, 248, 250, 251, 252, 241; 701/3, 4, 8, 14
See application file for complete search history.

(56) References Cited

U.S. PATENT DOCUMENTS

| | | | |
|---|---|---|---|
| 2005/0058152 A1* | 3/2005 | Oksanen et al. | 370/465 |
| 2005/0065669 A1 | 3/2005 | Roux et al. | |
| 2005/0220029 A1* | 10/2005 | Calluaud et al. | 370/241 |
| 2006/0215568 A1* | 9/2006 | Smith | 370/241 |
| 2008/0119972 A1* | 5/2008 | Peyrucain et al. | 701/14 |
| 2008/0155513 A1* | 6/2008 | Ling et al. | 717/135 |
| 2009/0180482 A1* | 7/2009 | Andreoletti et al. | 370/397 |
| 2009/0183038 A1* | 7/2009 | Andreoletti et al. | 714/708 |
| 2009/0193229 A1* | 7/2009 | Aegerter et al. | 712/30 |
| 2009/0228223 A1* | 9/2009 | Liu et al. | 702/59 |

FOREIGN PATENT DOCUMENTS

FR    2 832 011    5/2003

OTHER PUBLICATIONS

Jean-Francois Saint-Etienne, "Using AFDX as 429 Replacement", Announcement AEEC, XP-002427574, Sep. 1, 2004, pp. 1-11.
ARINC: "AFDX / ARINC 664 Tutorial (1500-049)" Internet Citation, [Online], XP-002429136, May 2005, 2 front pages, pp. I-IV, and pp. 1-47.
"CES White Paper on AFDX", Internet Citation, [Online], XP-002307590, Nov. 25, 2003, pp. 1-21.

* cited by examiner

*Primary Examiner*—Chi H. Pham
*Assistant Examiner*—Kevin Mew
(74) *Attorney, Agent, or Firm*—Oblon, Spivak, McClelland, Maier & Neustadt, L.L.P.

(57) ABSTRACT

A data integrity checking system in a frame-switched on-board network, including at least first and second asynchronous transmitter terminals, with the second transmitter terminal being in charge of monitoring the first transmitter terminal, and at least first and second receiving terminals, with the second receiving terminal being in charge of monitoring the first receiving terminal. The system includes a first multicast virtual link connecting the first transmitter terminal to the receiving terminals, a second virtual link connecting the first receiving terminal to the second transmitter terminal, the second virtual link not passing through any of the switches that are common to the branches of the first virtual link, a third virtual link connecting the second transmitter to the first receiving terminal in order to transmit thereto the result of an integrity check on the data received by the first receiving terminal.

10 Claims, 2 Drawing Sheets

METHOD OF DATA INTEGRITY CONTROL IN AN AFDX NETWORK

TECHNICAL FIELD

This invention relates to the field of safety systems on board an aircraft and more particularly to data integrity control in an on-board network.

PRIOR ART

Systems safety is a major concern in the design of an aircraft. In particular, the integrity of certain types of measurement data, considered to be critical for piloting the plane, must be ensured. Among this data can be mentioned the data relative to the positioning of the plane or that providing the remaining amount of fuel.

This data is generally emitted by redundant sensors intended for a plurality of calculation and/or display systems present in the avionics bay. Data transmission is carried out using an on-board network, typically an AFDX network (Avionics Full-duplex Switched Ethernet).

The AFDX network, developed for the needs of aeronautics, is based on a switched Ethernet network.

In a switched Ethernet network, each terminal, source or destination, is individually connected to a frame switch and the switches are connected to one another by physical links. More precisely, each switch has a plurality of ports connected to the ports of other switches or terminal couplers.

A virtual link in an AFDX network is a level 2 link in the underlying switched Ethernet network. More precisely a virtual link between a source terminal and a destination terminal is defined as a path oriented across the network, used by the frames of the source terminal intended for the destination terminal.

A detailed description of the AFDX network is provided in the document entitled "AFDX protocol tutorial" available on the site www.condoreng.com as well as in patent application FR-A-2832011 filed in the name of the applicant. It will simply be reminded here that the AFDX network is full-duplex, deterministic and redundant.

By full-duplex, it is meant that each terminal can simultaneously send and receive frames on distinct virtual links. The AFDX network is deterministic, in the sense that the virtual links have guaranteed characteristics in terms of bounded latency, physical segregation of flow, bandwidth and speed. Each virtual link has for this a path reserved from end to end across the network. Finally, the AFDX network is redundant since the underlying Ethernet network is duplicated for reasons of availability. The data is transmitted in the form of encapsulated IP packets in Ethernet frames. Contrary to conventional Ethernet switching (using the Ethernet address of the destination), the switching of frames on an AFDX network uses a virtual link identifier included in the frame header. When a switch receives a frame on one of its input ports, it reads the virtual link identifier and uses its forwarding table to determine the output port(s) on which it must be transmitted. The switches verify on the flight the integrity of the frames transmitted without however requesting retransmission if a frame is erroneous: frames detected as erroneous are removed. Frames transiting on a virtual link are sequentially numbered. At reception, the destination terminal verifies the integrity of the sequence of the frames.

Each virtual link is unidirectional. It can only stem from one source terminal at a time but can end up at several destinations. A distinction is made between virtual links in point-to-point mode (or unicast), that serve only one destination, from virtual links in multi-point mode (or multicast) that serve several. When there is a virtual link of the unicast or multicast type between a source terminal and a destination terminal, it is also said that the second is subscribed to the first.

Moreover, critical data in the sense defined hereinabove is generally subject to a double verification, firstly at the level of their emission and secondly at the level of the treatment after reception. More precisely, each sensor, or transmitter terminal, of critical data is duplicated: a first transmitter is monitored by a second transmitter, referred to as control. Likewise at reception, it is provided a first receiver subscribed to the first transmitter and a second receiver subscribed to the second transmitter. The second receiver monitors the first, i.e. the data received and possibly received by the other.

FIG. 1 shows schematically an on-board system comprising a pair of transmitter terminals and a pair of receiving terminals connected through an AFDX network. Receiving terminal 103, denoted as COM, is subscribed to transmitter terminal 101, also denoted as COM, by a virtual link $VL_1$. Likewise receiving terminal 104, denoted as MON, is subscribed to the transmitter terminal 102, also denoted as MON, by a virtual link $VL_2$. Virtual link $VL_1$ passes through switches $SW_1$ and $SW_2$ of the network. Likewise, virtual link $VL_2$ passes through switches $SW_3$ and $SW_4$.

Transmitter MON monitors the data transmitted by transmitter COM and receiver MON monitors the data received and possibly treated by the receiver COM. To accomplish this, the transmitter, respectively the receiver COM, transmits its data to the transmitter, respectively to the receiver COM via a bus external to the AFDX network, for example a CAN bus.

It will be understood that the MON and COM functions can be provided in a crossing and push-pull configuration. More precisely, receiver 103 monitors the integrity of the data of receiver 104, as the latter monitors the integrity of the data of receiver 103. In the same way, transmitter 101 and transmitter 103 monitor each other mutually in a crossing configuration.

When receivers 103 and 104 carry out a treatment on the data received, the check can concern the thus treated values. More precisely if the treatment corresponds to a function F, the two receivers will make use of software or hardware implementations that are different from this same function, and will compare the values obtained thanks to these different implementations of the same function.

If a piece of data is considered as lacking integrity by transmitter 101 or 102, acting as transmitter MON, the latter does not transmit the data to the corresponding receiver. Alternatively, it can transmit this data by adding to it a piece of information that declares it as invalid. Similarly, if receiver 103 or 104, acting as receiver MON considers that the data received (and possible treated by the receiver COM) is lacking integrity, the latter warns the receiver COM of this, which, subsequently, does not take it into account. Integrity faults can be caused by a transmission error (for example corruption of a frame when passing in a switch) or by a treatment error in the receiver itself.

Data integrity control must take into account the asynchronism of the transmitters. More precisely, on the receiving side, the integrity control is accomplished using a tolerance level $\delta_T$, i.e. thanks to the comparison:

$$|d_{com}(i) - d_{mon}(i)| \leq \delta_T \tag{1}$$

where $d_{com}(i)$ is the current data received/treated by the receiver COM via the virtual link $VL_1$ and $d_{com}(i)$ the corresponding control information, received from the receiver MON. If the result of the comparison is positive, the piece of data $d_{com}(i)$ is considered to have integrity. The threshold $\delta_T$ is chosen according to the full scale $s_{max}$ of the measured data and of the upper limit of the time shift $\Delta\tau_{max}$ that they may be subjected to, more precisely $\delta_T > s_{max}\Delta\tau_{max}$ is chosen. The time shift $\Delta\tau_{max}$ is a function of the asynchronism of the transmitters, the difference in transit time on the $VL_1$ and $VL_2$ links, and the transmission delay of the control data.

If the data transmission rate, for example the sampling frequency of the parameter to be measured, is low, the time shift $\Delta\tau_{max}$ can be relatively substantial, which could result in a high threshold value $\delta_T$ even with signals with a moderate scale. In this case, test (1) is therefore inaccurate and erroneous data risks being incorrectly considered as having integrity.

On the other hand, as has been shown, when the data must be treated by the receivers, different implementations of the function F must be provided. This results for example in providing two distinct pieces of software implementing this same function, with the associated development and maintenance costs.

The purpose of this invention is to propose a data integrity checking system that does not have the aforementioned disadvantages, i.e. that it has low sensitivity to the asynchronism and that it does not require the use of distinct software.

DESCRIPTION OF THE INVENTION

This invention is defined by a data integrity checking system in a frame-switched on-board network, including at least first and second asynchronous transmitter terminals, with the second being in charge of monitoring the first, and at least first and second receiving terminals, the second being in charge of monitoring the first, wherein is provided:

a first multicast virtual link connecting the first transmitter terminal to said receiving terminals, to transmit the data from said first transmitter terminal to said receiving terminals;

a second virtual link connecting the first receiving terminal to the second transmitter terminal, to transmit to the latter the data that the first receiving terminal received from the first transmitter terminal, said second virtual link passing through none of the switches that are common with the branches of the first virtual link;

a third virtual link connecting the second transmitter terminal to the first receiving terminal to transmit to it the result of an integrity check on the data received by the first receiving terminal.

More preferably, the first receiving terminal performs a process (F) on the data received ($d_{com}(i)$) from the first transmitter terminal, transmits the data thus processed ($F(d_{com}(i))$) to the second receiving terminal, and the latter performs the inverse process on said processed data, then carries out a first comparison of the thus obtained result ($F^{-1}(F(d_{com}(i)))$) with the data ($d_{mon}(i)$) that it has itself received from the first transmitter terminal by said first virtual link.

The second receiving terminal transmits advantageously the result of the first comparison to said first receiving terminal.

If the result of the first comparison is negative, the first receiving terminal does not take the processed data into account.

Said processed data and said result of the first comparison are transmitted for example using a CAN bus.

More preferably, the second transmitter terminal verifies the integrity of a piece of data received from the first receiving terminal by carrying out a second comparison of said data with the data that it has just emitted to the second receiving terminal.

The result of the second comparison is advantageously transmitted to at least the first receiving terminal.

If the result of the second comparison is negative, the first receiving terminal does not take the received data into account.

According to an alternate embodiment, said on-board network is an AFDX network.

Finally, the invention relates to an aircraft comprising a data integrity checking system such as disclosed hereinabove.

DETAILED DESCRIPTION OF PARTICULAR EMBODIMENTS

We consider again a pair of transmitters and a pair of receivers subscribed to these transmitters via a frame-switched on-board network, for example an AFDX network.

The first idea at the basis of the invention is to reduce the asynchronism of the system by transmitting data from one transmitter simultaneously to two receivers MON and COM. To accomplish this, the two receivers in question are subscribed to each transmitter thanks to a multicast link.

Figure 1:
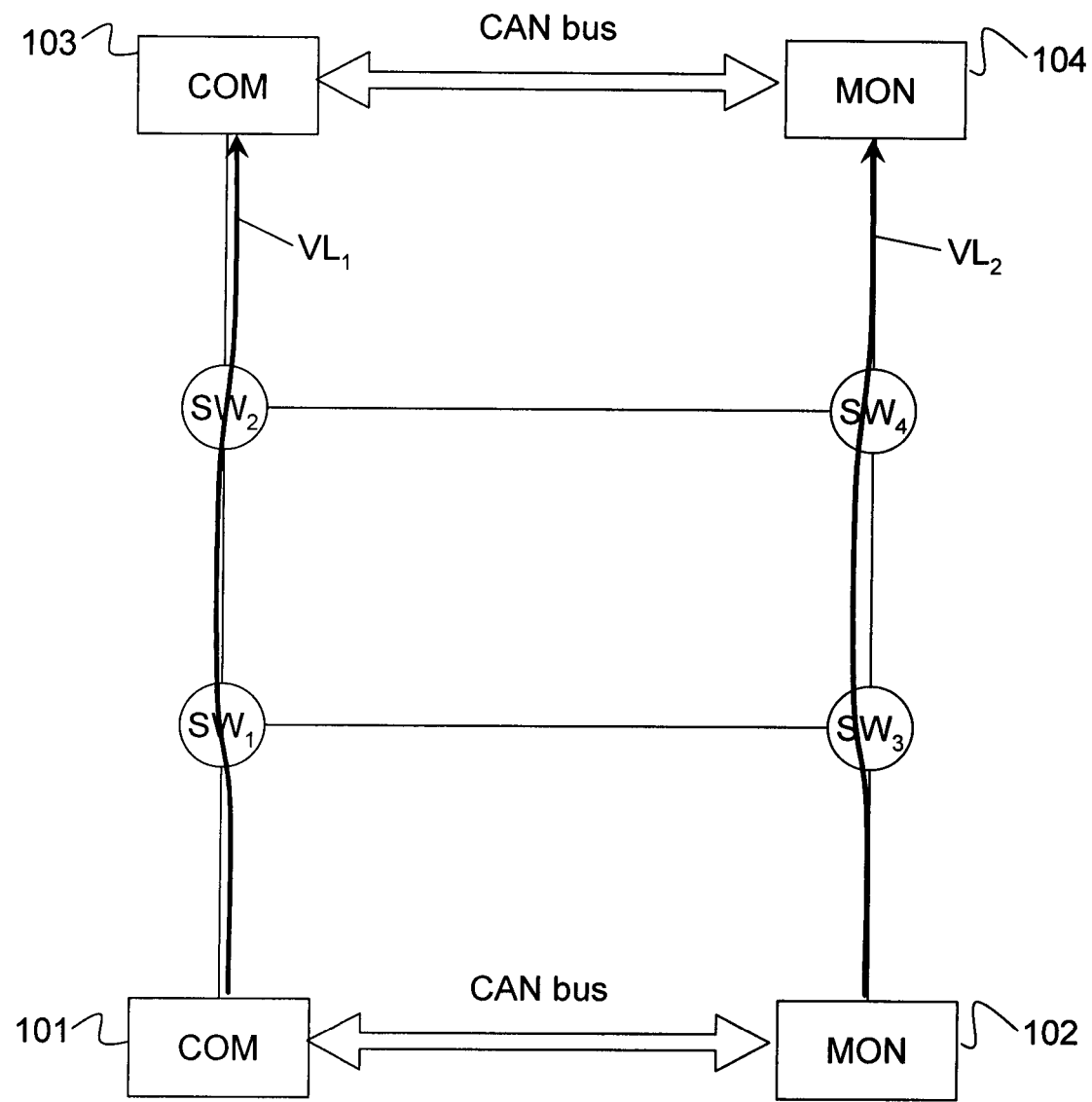
FIG. 1 shows a data integrity checking system as known in the prior art.
Figure 2:
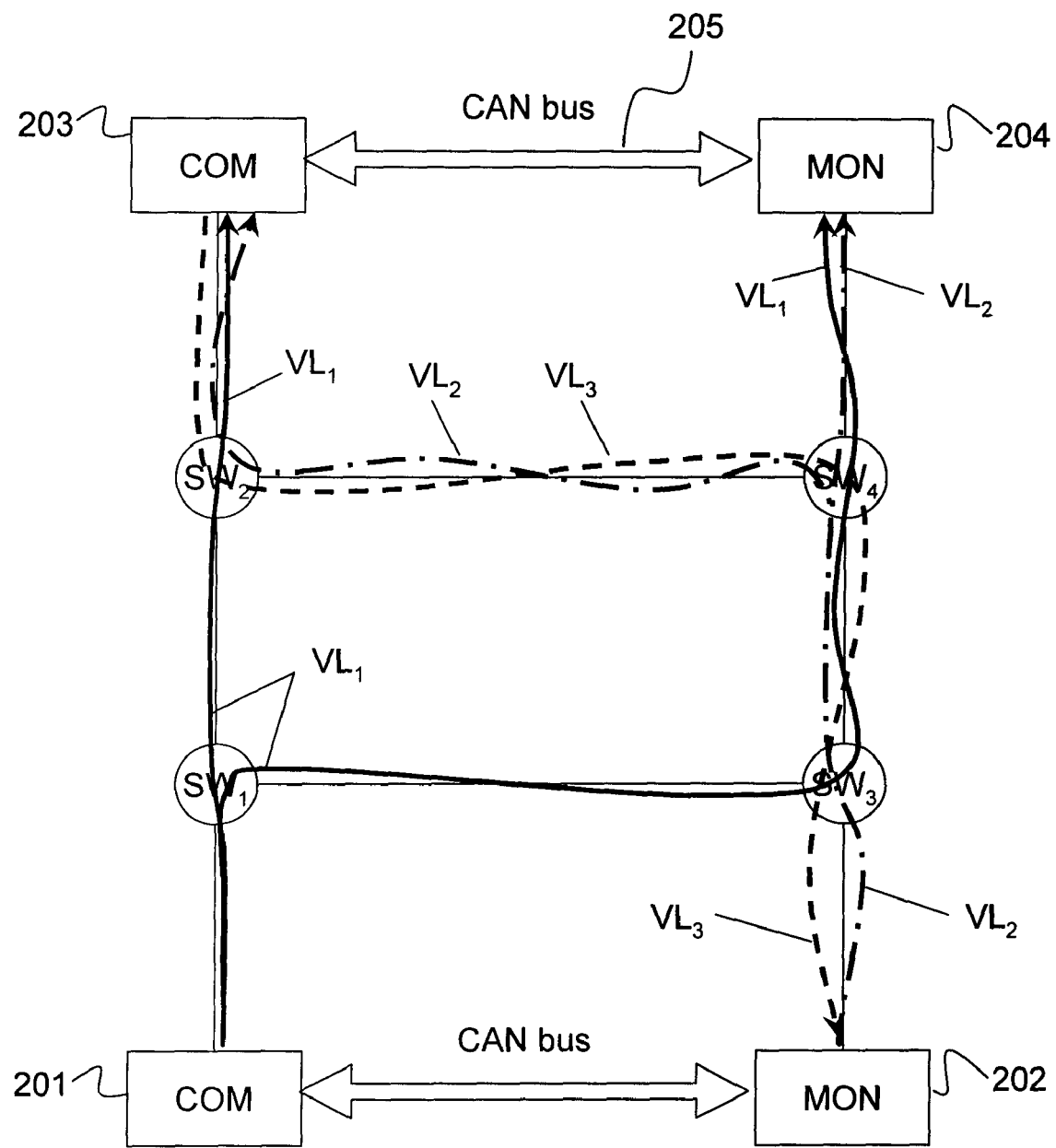
FIG. 2 shows a data integrity checking system according to an embodiment of the invention.

FIG. 2 schematically shows the data integrity checking system according to an embodiment of the invention.

Receivers 203 and 204 are both subscribed to transmitter 201 via the multicast virtual link $VL_1$. It will be assumed that transmitter 202 and the receiver 204 fulfill the role (MON) of monitoring the transmitter 201 and the receiver 203 respectively. In practice, transmitters and receivers can monitor each other in a crossing configuration as in the prior art, in which case the receivers will also be subscribed to the transmitter 202 via a multicast virtual link $VL_2$.

The branches of the multicast virtual link $VL_1$ (connecting respectively transmitter 210 to receivers 203 and 204) have a common switch $SW_1$. Generally, the branches of the multicast virtual link $VL_1$ will have the smallest possible number of common switches. It is indeed understood that if a common switch is defective, identical errors could affect the frames received by both receivers without it moreover being possible to detect them. In the following, we shall denote as $\Omega$ the set of switches that are common to the branches of virtual link $VL_1$ serving both receivers.

Since receivers MON and COM are subscribed to the same source, i.e. transmitter 101, they receive the data simultaneously, if the difference between the propagation times in the two branches of the virtual link is neglected. After having received data $d_{com}(i)$, the receiver COM performs a data processing F and transmits the data thus processed $F(d_{com}(i))$ to the receiver MON via the CAN bus 205. Receiver COM verifies that the data processing has been correctly performed, for example by applying the reciprocal function $F^{-1}$ and by comparing the result thus obtained $F^{-1}(F(d_{com}(i)))$ with the data that it received itself, denoted as $d_{mon}(i)$. Since the data $d_{mon}(i)$ and $d_{com}(i)$ are synchronous, provided we neglect the difference between the propagation times on the branches of the virtual link, the comparison threshold $\delta_T$ chosen could be relatively low, and even equal to zero.

However, even if the test of $F^{-1}(F(d_{com}(i)))$ with $d_{mon}(i)$ is positive, integrity for this data cannot be definitively ascertained. Indeed, if a frame is affected with an error during its switching through a switch of Ω, i.e. a switch that is common to both branches of the virtual link, the data $d_{com}(i)$ and $d_{mon}(i)$ could both be affected by the same error.

In order to allow for the detection of such an error, the system provides a virtual return link, also referred to as a virtual echo link. $VL_3$ represents such a virtual echo link connecting receiver COM 203 to transmitter MON 202. The routing of the virtual link $VL_3$ is chosen in such a way that the latter does not pass through any of the switches of the set Ω, in other words the virtual echo link is segregated with respect to the switches that are common to the branches of the direct virtual link $VL_1$. Receiver COM 203 transmits on the echo link each piece of data $d_{com}(i)$ that it receives from transmitter COM 101. Transmitter MON 202 then compares this data with the current data and transmits the result of this comparison via a virtual link to the first receiver COM. This virtual link can be unicast or, as indicated in the figure, multicast. This will in particular be the case if virtual link $VL_2$ is used to do this, serving moreover to the second transmitter terminal to transmit its data to the first and second receiving terminals. We then have a full symmetrical system with a second virtual echo link (not shown) starting from the second receiving terminal 204 intended for the first transmitter terminal 201.

If the result of the comparison is negative, it is concluded that the data $d_{com}(i)$ and $d_{mon}(i)$ are affected by the same error. Transmitter MON 202 then warns at least the receiver COM, and even both receivers, of this situation. The receiver(s) subsequently inhibit the use of d(i), in other words, the processed data F(d(i)) is not taken into account.

As has been shown, the data integrity checking system according to the invention is dissociated into two portions, a first portion making it possible to verify the integrity of the data processing and of the transmission through distinct elements of the branches of the virtual link and a second portion making it possible to verify the integrity of the transmission through the elements that are common to said branches. The first portion overcomes the problems of asynchronism, the second portion makes it possible to remove the remaining cases of error. Moreover, both receivers MON and COM include only implementations of the functions F and $F^{-1}$, in such a way that it is no longer necessary to provide distinct implementations of the same function F.

According to an example of a particular embodiment, transmitter terminals 201 and 202 are fuel gauge calculators and receivers 203 and 204 are display equipment making it possible to display the remaining quantity of fuel on board.

The invention claimed is:

1. A data integrity checking system in a frame-switched on-board network, comprising:
   at least first and second asynchronous transmitter terminals, the second asynchronous transmitter terminal (202) being charged with monitoring the first asynchronous transmitter terminal (201), and at least first and second receiving terminals, the second receiving terminal (204) being in charge of monitoring the first receiving terminal (203);
   a first multicast virtual link ($VL_1$) connecting the first asynchronous transmitter terminal (201) to said first and second receiving terminals (203,204), to transmit data from said first asynchronous transmitter terminal to said first and second receiving terminals;
   a second virtual link ($VL_3$) connecting the first receiving terminal (203) to the second asynchronous transmitter terminal (202), to transmit to the second asynchronous transmitter terminal the data that the first receiving terminal received from the first asynchronous transmitter terminal, said second virtual link not passing through any switches ($SW_1$) that are common to the branches of the first virtual link; and
   a third virtual link ($VL_2$) connecting the second transmitter terminal to the first receiving terminal to send to the first receiving terminal the result of a data integrity check of the data received by the first receiving terminal.

2. The checking system according to claim 1, wherein the first receiving terminal carries out a process (F) on the data received ($d_{com}(i)$) from the first asynchronous transmitter terminal, transmits the data thus processed ($F(d_{com}(i))$) to the second receiving terminal, and the second receiving terminal latter performs the inverse process on said processed data then carries out a first comparison of the thus obtained result ($F^{-1}$ ($F(d_{com}(i))$)) with the data ($d_{mon}(i)$) that it has itself received from the first asynchronous transmitter terminal by said first virtual link.

3. The checking system according to claim 2, wherein the second receiving terminal (204) transmits the result of the first comparison to said first receiving terminal (203).

4. The checking system according to claim 3, wherein if the result of the first comparison is negative, the first receiving terminal (203) does not take the processed data into account.

5. The checking system according to any one of claims 2 to 4, wherein said processed data and said result of the first comparison are transmitted using a CAN bus (205).

6. The checking system according to claim 1, wherein the second asynchronous transmitter terminal (202) checks the integrity of a piece of data received from the first receiving terminal (203) by carrying out a second comparison of said data with the data that it has just emitted to the second receiving terminal.

7. The checking system according to claim 6, wherein the result of the second comparison is transmitted to at least the first receiving terminal (203).

8. The checking system according to claim 7, wherein, if the result of the second comparison is negative, the first receiving terminal does not take the received data into account.

9. The checking system according to claim 1, wherein said on-board network is an AFDX network.

10. An aircraft comprising a data integrity checking system according to claim 1.

* * * * *